US012209377B2

(12) United States Patent
Kapteijn

(10) Patent No.: US 12,209,377 B2
(45) Date of Patent: Jan. 28, 2025

(54) DEVICE FOR ATTENUATING UNDERWATER SOUND PRESSURE AND THE USE OF SUCH A DEVICE

(71) Applicant: ALFA LAVAL ROTTERDAM B.V., Rotterdam (NL)

(72) Inventor: Pieter Karel Anton Kapteijn, Hilversum (NL)

(73) Assignee: ALFA LAVAL ROTTERDAM B.V., Rotterdam (NL)

( * ) Notice: Subject to any disclaimer, the term of this patent is extended or adjusted under 35 U.S.C. 154(b) by 227 days.

(21) Appl. No.: 17/918,639

(22) PCT Filed: Apr. 19, 2021

(86) PCT No.: PCT/EP2021/060033

§ 371 (c)(1),
(2) Date: Oct. 13, 2022

(87) PCT Pub. No.: WO2021/209638

PCT Pub. Date: Oct. 21, 2021

(65) Prior Publication Data

US 2023/0349122 A1 Nov. 2, 2023

(30) Foreign Application Priority Data

Apr. 17, 2020 (EP) .................................... 20170186

(51) Int. Cl.
*E02D 13/00* (2006.01)
*G10K 11/16* (2006.01)

(52) U.S. Cl.
CPC .......... *E02D 13/005* (2013.01); *G10K 11/161* (2013.01); *G10K 2200/11* (2013.01)

(58) Field of Classification Search
CPC ................ E02D 13/005; G10K 11/161; G10K 2200/11; B63B 1/38; B63B 2001/387; F15B 21/12
See application file for complete search history.

(56) References Cited

U.S. PATENT DOCUMENTS 6,571,906 B2 * 6/2003 Jones ....................... G01V 1/04 367/145
9,611,010 B2 4/2017 Kapteijn
(Continued)

FOREIGN PATENT DOCUMENTS

CN 206921468 U 1/2018
JP 63-41200 U 3/1988
(Continued)

OTHER PUBLICATIONS

International Search Report for PCT/EP2021/060033, Prepared be the European Patent Office, mailing date Jun. 28, 2021, 4 pages.
(Continued)

*Primary Examiner* — Jeremy A Luks
(74) *Attorney, Agent, or Firm* — Birch, Stewart, Kolasch & Birch, LLP

(57) ABSTRACT

A device for reducing underwater sound energy and propagation, whereby the device includes at least one bubble generation unit and an air conduit for supplying pressurized air to the bubble generation unit, whereby the bubble generation unit has a fluidic oscillator for generating one or more pulsating air flows from a constant air flow, and whereby preferably the fluidic oscillator has an adjustable oscillation frequency, and a method for using such a device for reducing underwater sound propagation, whereby the air conduit and the bubble generation unit are placed underwater, whereby pressurized air is supplied to the air conduit and whereby air bubbles are generated by the bubble generation unit.

13 Claims, 6 Drawing Sheets

(56) References Cited

U.S. PATENT DOCUMENTS

| | | | | |
|---|---|---|---|---|
| 10,546,660 | B2 * | 1/2020 | Laberge | F15D 1/0095 |
| 11,865,556 | B2 * | 1/2024 | Hossain | F01D 5/16 |
| 2003/0034197 | A1 | 2/2003 | Jones et al. | |
| 2011/0277848 | A1 * | 11/2011 | Burns | F04F 7/00<br>137/833 |

FOREIGN PATENT DOCUMENTS

| | | | | | |
|---|---|---|---|---|---|
| JP | 2013-529570 | A | | 7/2013 | |
| WO | WO 2011/161187 | A1 | | 12/2011 | |
| WO | WO-2020208250 | A1 | * | 10/2020 | B01F 23/2366 |

OTHER PUBLICATIONS

Tesar Vaclav, Taxonomic trees of fluidic oscillators, EPJ Web of Conferences, 143, 02128 (2017)
English translation of the Japanese Office Action for Japanese Application No. 2022-562756, dated Jun. 10, 2024.

* cited by examiner

DEVICE FOR ATTENUATING UNDERWATER SOUND PRESSURE AND THE USE OF SUCH A DEVICE

CROSS-REFERENCE TO RELATED APPLICATION

This application is the U.S. national phase of PCT Application No. PCT/EP2021/060033 filed on Apr. 19, 2021, which claims priority to EP patent application No. 20170186.9 filed on Apr. 17, 2020, the disclosures of which are incorporated in their entirety by reference herein.

The present invention concerns a device for attenuating underwater sound pressure, in other words for reducing underwater sound propagation, and the use of such a device.

It is known that in offshore and inland water heavy engineering construction works, such a for example pile driving for off-shore wind mills, sounds are generated which can be disturbing or even dangerous for marine animals. Additionally these sounds can travel significant distances through the water and through the seabed.

A known method of reducing the effect of the sound resulting from such heavy engineering works is to employ air bubble screens around the source of the sound. These bubbles reflect and absorb the acoustic energy.

The known devices for doing this generate air bubbles by simply forcing pressurized air through holes. Such devices however require a very significant amount of pressurized air and generate bubbles of a size that is usually not optimal for efficiently reflecting and absorbing the acoustic energy.

Additionally, the bubbles generated are unstable and easily coalesce and/or break up depending on the local conditions. Also, the bubble size generated is highly influenced by variations in pressure and temperature of the supplied air.

The invention aims to solve these problems and therefore provides for a device for reducing underwater sound propagation, in other words for attenuating underwater sound pressure, whereby the device comprises at least one bubble generation unit and an air conduit for supplying compressed air to the bubble generation unit, whereby the bubble generation unit comprises a fluidic oscillator for generating one or more, and preferably two, pulsating air flows from a constant air flow.

Such an oscillator can be a well-known standard bistable two-loop fluidic oscillator, such as for instance shown in FIG. 1 of 'Taxonomic trees of fluidic oscillators. Tesař, Vaclay. (2017). EPJ Web of Conferences. 143. 02128. 10.1051/epjconf/201714302128.' or a more complex variant thereof as explained later.

Due to the fact that each resulting air pulse from the oscillator holds a certain amount of air, which amount is only weakly dependent on the inlet pressure of the oscillator, air bubbles with a specific, relatively uniform and constant size, can easily be generated. A bubble generating unit generating mainly air bubbles of a desired size can therefore easily be constructed.

This is beneficial because there is a strong correlation between the absorption and reflection of sound energy of a specific frequency and the optimal bubble size.

Considering that for every frequency of acoustic energy there is a specific bubble size that is most efficient for absorption and reflection, the device of the invention can thereby be optimally designed for absorbing and reflecting underwater sounds of one or more frequencies or frequency ranges known to be generated by specific underwater engineering works.

As a result, a device according to the invention can generate a desired bubble size, increasing both the effectiveness of the device in absorbing and reflecting acoustic energy as well as reducing the amount of air needed to achieve this.

CN206921468 discloses a device that uses a bubble curtain to block sound propagation under comprising an acoustic wave receiver, a blower, a bubbling tube, an airtight ventilation tube and an air jet plate, wherein the device is associated with a rotor to realize the function of adjusting the number and diameter of the bubbles. EP2585364 discloses an apparatus for generating bubbles for reducing drag on a hull of a ship, wherein the bubble generating device is attachable to an outer surface of the hull, and wherein the apparatus comprises one or more microfluidic device for controlling a bubble size of the generated bubbles.

In a preferred embodiment the fluidic oscillator is a fluidic oscillator with an adjustable oscillation frequency, whereby the oscillation frequency of the fluidic oscillator is adjustable independently of the air pressure in the air conduit and the pressure at the outlet of the bubble generation unit.

The advantage is that the amount of air per pulse, and thereby the bubble size, can be adapted depending on local conditions and specific requirements.

In a preferred embodiment the device comprises sound capturing means and a control unit, whereby the control unit is arranged to receive an input signal from the sound capturing means and to send to the fluidic oscillator a control signal for controlling the oscillation frequency, whereby the control unit is arranged to calculate the control signal using the input signal, preferably by the control unit being is arranged, e.g. by programmation, to calculate a sound frequency distribution from the input signal and being arranged to calculate the control signal from the sound frequency distribution.

This allows an active control of the bubble size when the device is in use, whereby the device can automatically control itself to generate bubbles that are optimal for absorbing and reflecting the actually present dominant sound frequencies, even if the sounds generated are different than expected or change over time.

Preferably the device comprises at least four, and more preferably at least ten, and more preferably at least fifteen bubble generation units per air conduit. Preferably each bubble generation units comprises a separate fluidic oscillator, and preferably each bubble generation units comprises at least eight separate fluidic oscillators.

In a preferred embodiment the device comprises a first type of said fluidic oscillator and a second type of said fluidic oscillator, whereby the first type of said fluidic oscillator and the second type of said fluidic oscillator are designed to operate at different oscillation frequencies if they are supplied with air at the same pressure.

This way, both the first type and the second type of fluidic oscillator can be connected to a common air conduit, for instance in an alternating configuration, so that two frequencies or frequency ranges of acoustic energy can be absorbed and reflected.

Said first type of fluidic oscillator and said second type of oscillator may be present in the same bubble generation unit or may be present in different bubble generation units.

In a preferred embodiment the air conduit is a flexible air hose, whereby the device comprises a plurality of said bubble generation units arranged along at least a part of the length of the air hose. Preferably the number of bubble generation units, which may comprise one or more fluidic oscillators each, is such that the number of fluidic oscillators is at least one per meter of air conduit length, and more preferably at least three per meter of air conduit length.

This allows easy installation of the device on the seabed with the hose encircling the source of sound.

In a preferred embodiment the bubble generation unit comprises a bubble generation unit body having a bubble outlet channel which is open at its top end and at its bottom end, whereby the fluidic oscillator comprises an air outlet which debouches in the bubble outlet channel.

The bubble outlet channel, at least above the point where the fluidic oscillator debouches in the bubble outlet channel, is usually vertical or mainly vertical.

In such a bubble generation channel the bubbles will act as an air lift pump, and thereby establish an upward flow of water, mixed with the bubbles. This upward flow of water ensures that the bubbles are efficiently removed from the air outlet of the fluidic oscillator, so that coalescence of these bubbles is avoided.

The invention also concerns the use of a device according to the invention for reducing underwater sound propagation, whereby the air conduit and the bubble generation unit are placed underwater, whereby pressurized air is supplied to the air conduit and whereby air bubbles are generated by the bubble generation unit.

Preferably, the air conduit encircles the source of underwater sound, whereby the device comprises at least four bubble generation units which are placed underwater. This way, sound propagation is reduced in all directions from a source of underwater sound.

Preferably the device comprises at least one bubble generation unit per 5 meters of air conduit length, and more preferably at least one bubble generation unit per 2 meters of air conduit length.

In a preferred variant of the use according to the invention, the device is a device according to claim 3 or 4, whereby the sound capturing means is placed underwater, whereby the air conduit is placed between the sound capturing means and a source of underwater sound, whereby preferably the control unit controls the oscillation frequency of the fluidic oscillator depending on the frequency distribution of the sound captured by the sound capturing means.

This way the control unit can, via control of the oscillation frequency, control the bubble size to ensure maximum reduction in sound propagation of the dominant sound frequencies, or alternatively of specific sound frequencies considered to be the most harmful or disturbing.

In a preferred variant of the use according to the invention, the device comprises at least two fluidic oscillators, each having an adjustable oscillation frequency, whereby the at least two fluidic oscillators are supplied with air from the same air conduit, whereby a first of said fluidic oscillators is controlled to operate at a first oscillation frequency, whereby a second of said fluidic oscillators is controlled to operate at a second oscillation frequency.

This way, two different bubble sizes can be generated, so that a larger part of the sound spectrum emanating from the source of underwater sound can be absorbed or reflected.

In a preferred variant of the use according to the invention, first device and a second device, both according to the invention, are used, whereby the air conduit of the first device encircles a source of underwater sound, whereby the air conduit of the second device encircles the air conduit of the first device.

This way, acoustic energy not absorbed or reflected by the first device can be absorbed or reflected by the second device. If the bubble generation unit of the first device generates bubbles of a different size and size distribution than the bubble generation unit of the second device this will work even better, because acoustic energy of different frequencies or frequency ranges is then absorbed by the two devices.

In order to illustrate the invention, exemplary embodiments are explained below, with reference to the following figures, wherein.

Figure 1:
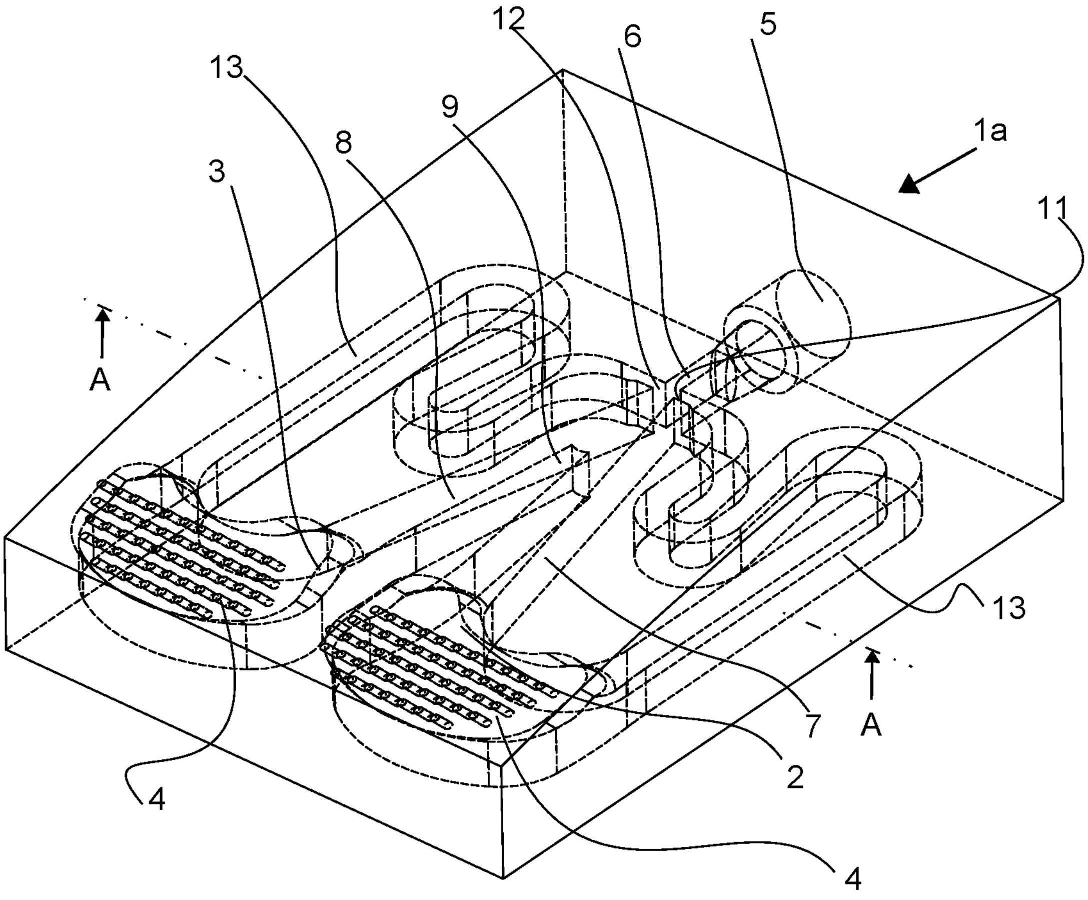
FIG. 1 shows a perspective view of a first embodiment of a first component of a device according to the invention.
Figure 2:
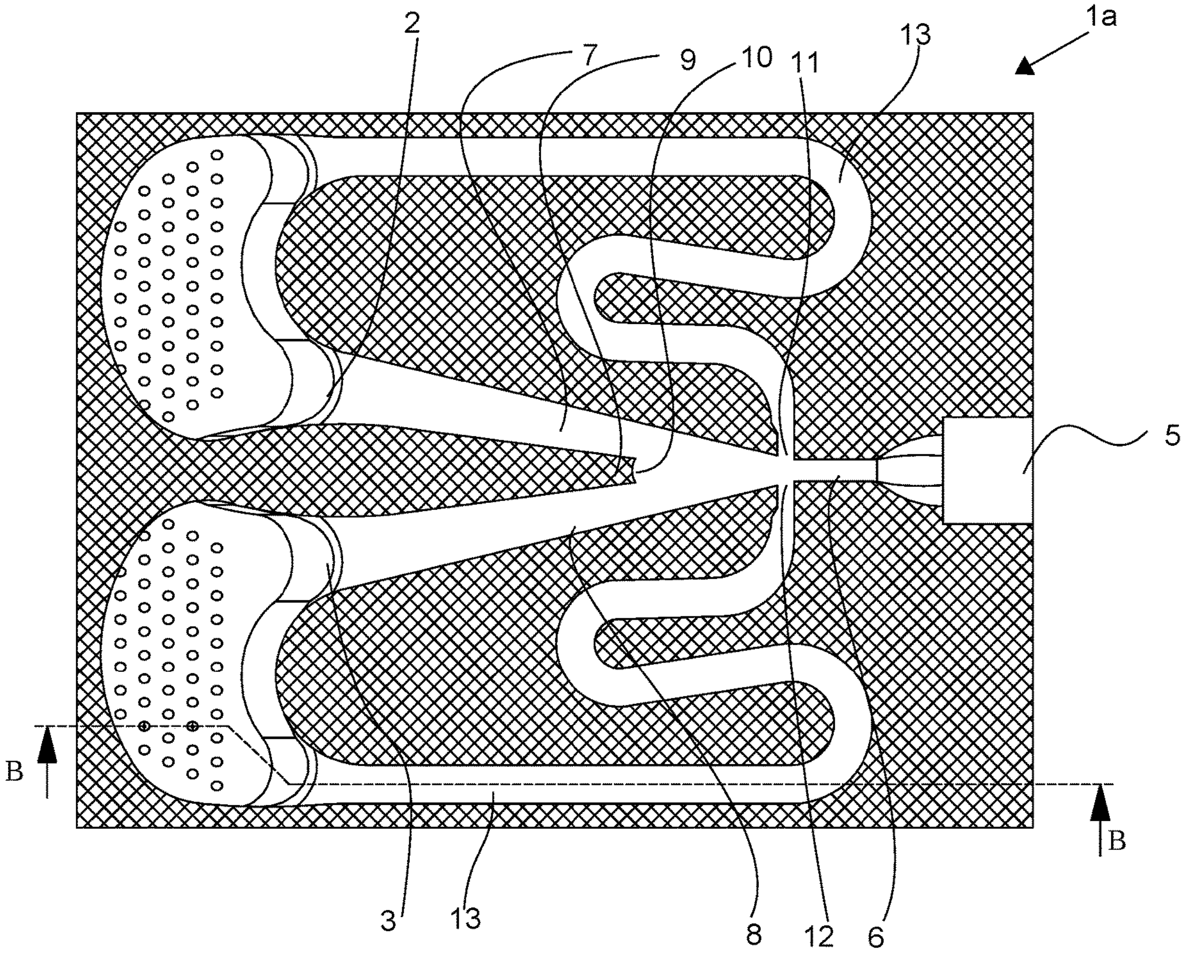
FIG. 2 shows a cross-section of the component of FIG. 1 according to line A-A.
Figure 3:
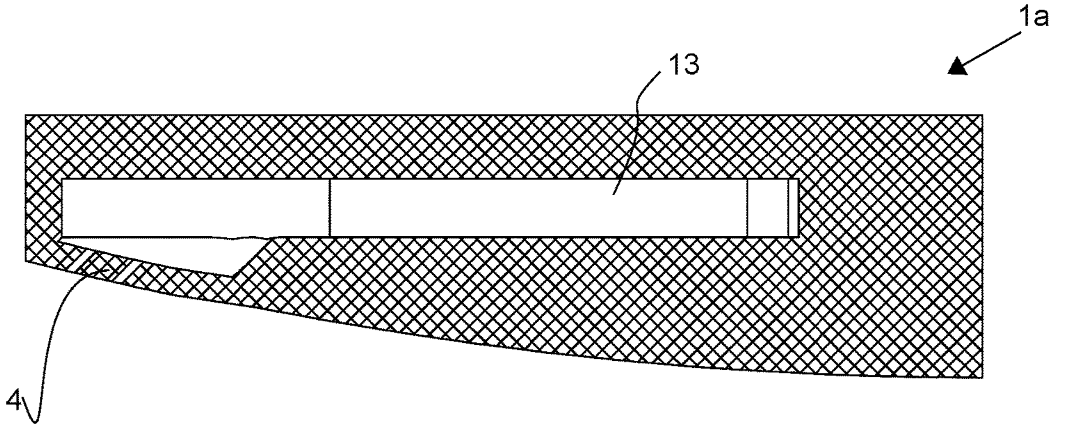
FIG. 3 shows a cross-section of the component of FIGS. 1 and 2 according to line B-B.

The oscillator 1*a* of FIGS. 1 to 3 is a traditional fluidic oscillator, of which the air outlets 2,3 are provided with perforated plates 4 with fifty round holes of 1.7 mm diameter each. This fluidic oscillator 1*a* is further called the first oscillator.

The first oscillator 1*a* comprises a first air inlet 5 and an air inlet channel 6 leading away from the first air inlet 5. The air inlet channel 6 widens and diverges into two air outlet channels, more specifically a first outlet channel 7 and a second outlet channel 8 which lead to the two aforementioned air outlets 2,3, more specifically to a first air outlet 2 and to a second air outlet 3, which are provided with said perforated plates 4.

The two outlet channels 7, 8 are separated by a splitter 9 with a concave nose 10.

The splitter 9 and the air inlet channel 6 and the outlet channels 7, 8 jointly constitute a bistable fluidic amplifier arranged to amplify control signals, whereby in this case the control signals are fed to the fluidic amplifier via a first control port 11 and a second control port 12.

From each of the air outlets 2,3, a feedback channel 13 leads back to the control ports at the point where the air inlet channel 6 widens.

The first oscillator 1*a* works as follows: A constant airflow is established at the first air inlet 5 and through the air inlet channel 6. This airflow will either flow through the first outlet channel 7 or through the second outlet channel 8, but not through both at the same time. If undisturbed, the air will continue to flow this way because of the Coanda-effect, which enhances the tendency for a fluid to follow a curved surface. The transition from the air inlet channel 6 to each of the outlet channels 7, 8 is such a curved surface. The concave nose 10 of the splitter 9 helps to create an induced secondary airflow that further stabilises the airflow through that particular outlet channel 7,8.

Most of the air flowing through this outlet channel 7,8 will then exit at the corresponding air outlet 2,3. However, this airflow also generates a pressure pulse which is sent back via the corresponding feedback channel 13 to the corresponding control port 11, 12, and which cause the airflow to switch to the other outlet channel 7,8.

If left undisturbed, a stable airflow through the other outlet channel 7, 8 will now be established. However, also at the other air outlet 2,3, a pressure wave is generated, which will be fed back via the feedback channel 13 to the corresponding control port 11,12, so that the airflow switches to the other outlet channel 7,8 again.

This way, a sequence of pressure control signals, in other words a pressure control wave, is established at both control ports 11, 12, every time switching the airflow from the first outlet channel 7 to the second outlet channel 8 and back, thereby generating two pulsating airflows, one in each of the outlet channels 7, 8, each pulsating with the same oscillation frequency and phase shifted by half a wave period.

These sequences of control signals are thereby amplified by the fluidic amplifier.

Figure 4:
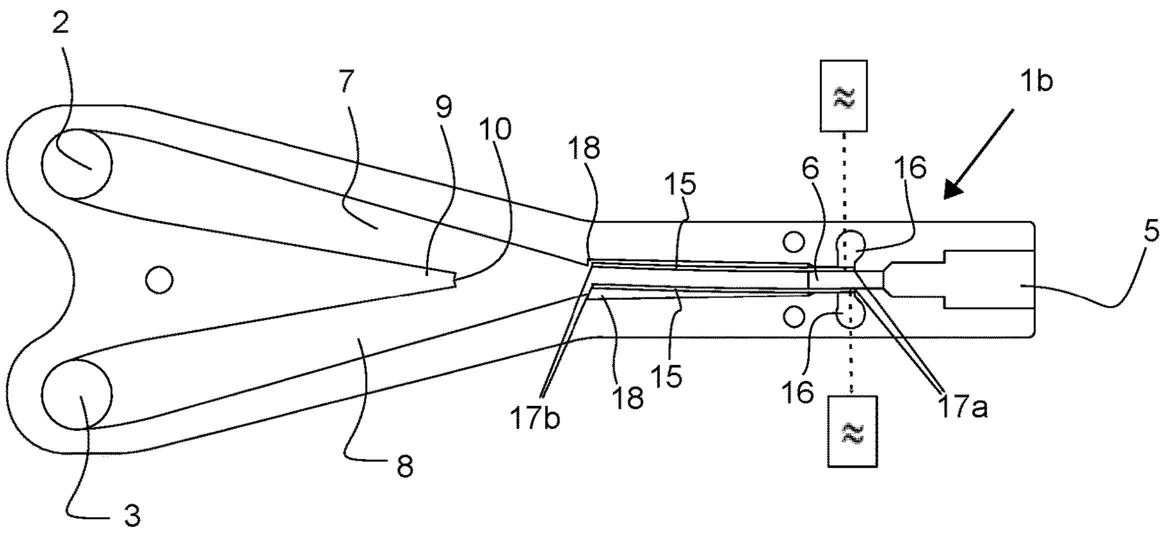
FIG. 4 shows a cross-section in an analogous view as FIG. 2, of a second embodiment of the first component, in a first state of use.
Figure 5:
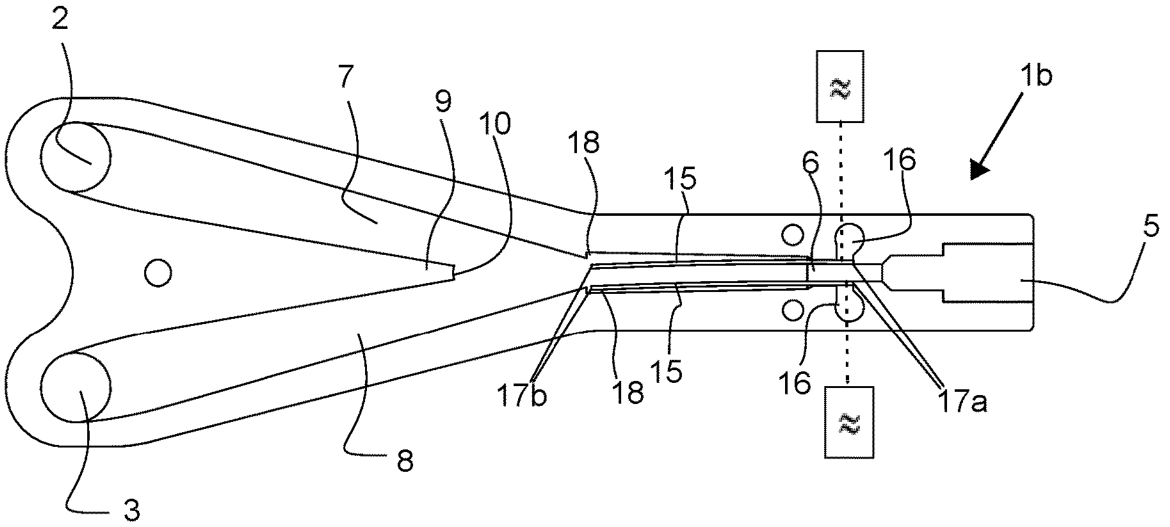
FIG. 5 shows the component of FIG. 4, in a second state of use.

The oscillation frequency of the first oscillator 1*a* is more or less fixed, depending on the exact design of the first oscillator 1*a*. A change in air pressure at the first air inlet 5, resulting in a change in the total air flow rate through the first oscillator 1*a*, will influence the oscillation frequency to a relatively small degree, but the oscillation frequency can not be controlled independently of the air flow rate A second fluidic oscillator 1*b*, further called the second oscillator, as shown in FIGS. 4 and 5, differs mainly from the traditional oscillator in that there are no feedback channels 13 and no control ports 11, 12. Consequently, the outer contours of the housing of the second oscillator 1*b* can be much smaller.

It is noted that, although they are no perforated plates 4 indicated in the FIGS. 4 and 5 because this is not important for showing the difference with the first oscillator 1*a*, the air outlets 2,3 of the second oscillator 1*b* can easily be provided with such perforated plates 4, and usually are provided with such perforated plates 4.

In order to generate a control signal, the second oscillator 1*b* is instead provided with two piezo-electric bender actuators 15, which are extending in the length direction of the air inlet channel 6 and which are fixedly attached at one of their extremes 17*a*, near the first air inlet 5.

The actuators 15 are each connected to a source of alternating voltage, with a controllable frequency, via electrical wires which are not shown in the figures, but which run via wire channels 16 provided in the housing of the second oscillator 1*b*.

The actuators 15 can bend in two directions, depending on whether a positive or a negative voltage is applied to them. This results in a movement of the free extreme 17*b* of the actuators 15, so that the actuators 15 can adopt two working positions, one of which is shown in FIG. 4, and the other of which is shown in FIG. 5.

It will be clear that in case no voltage is applied, the actuators 15 adopt a neutral position, intermediate between these two working positions.

In order to accommodate the actuators 15 in their working positions, the housing of the second oscillator 1*b* is provided with matching recesses 18.

As can be seen in FIGS. 4 and 5, the actuators 15 constitute at least part of the wall of the air inlet channel 6.

The second oscillator 1*b* works as follows:

Like for the first oscillator 1*a*, a constant airflow is established at the first air inlet 5 and through the air inlet channel 6, with the actuators 15 in their neutral position. This airflow through the air inlet channel 6 establishes itself in a stable flow pattern into either the first outlet channel 7 or the second outlet channel 8, and then onward towards the corresponding air outlet 2,3.

Oscillation of the airflow through the second oscillator 1*b* is induced by applying an alternating voltage to the actuators 15. These actuators 15 will then alternatingly switch between the two working positions. A movement of the actuators 15 in one direction, eg from the working position shown in FIG. 4 to the working position shown in FIG. 5, will then cause the airflow to switch from the first outlet channel 7 to the second outlet channel 8, and therefore constitutes a first mechanical control signal for such a switch.

A movement of the actuators 15 the other direction, so from the working position shown in FIG. 5 to the working position shown in FIG. 4, will cause the airflow to switch from the second outlet channel 8 to the first outlet channel 7, and therefore constitutes a second mechanical control signal for an opposite switch of the airflow.

A repeated movement of the actuators 15 thereby generates a control wave of a mechanical-energy signal, which is amplified by the fluidic amplifier, every time switching the airflow from the first outlet channel 7 to the second outlet channel 8 and back, thereby generating two pulsating airflows, one in each of the outlet channels 7, 8, each pulsating with the same oscillation frequency and phase-shifted by half a wave period.

Even though it may appear from FIGS. 4 and 5 that the actuators 15 are directing the airflow from the first air inlet 5 channel towards one of the two outlet channels 7, 8, once the airflow is established in one of two outlet channels 7, 8, the actuators 15 are not needed anymore to maintain this airflow. Due to the Coanda-effect this airflow will remain stable even if the actuators 15 would be absent.

In order to obtain a reliable oscillation behaviour of the second oscillator 1*b*, both actuators 15 should be actuating at the same frequency. They do not necessarily need to operate exactly in phase, as, depending on the situation, a faster or slower switch from an airflow in one outlet channel 7,8 to an airflow in the other outlet channel 7,8 may be required and can be obtained by making one of the actuators 15 move slightly earlier than the other actuator 15.

It will be clear that the oscillation frequency of the second oscillator 1*b* will be the same as the frequency of the alternating voltage. This oscillation frequency can therefore be easily controlled by electronically altering the frequency of the alternating voltage. This can be done independently of the actual airflow through the second oscillator 1*b*.

A third fluidic oscillator 1*c*, further called the third oscillator, differs from the first oscillator 1*a* in that the feedback channels are absent. There are however, like in the first oscillator 1*a*, two control ports 11, 12 present in the air inlet channel 6. This part of the third oscillator 1*c* is essentially a traditional bistable fluidic amplifier with control ports 11, 12, and is not shown separately.

Figure 6:
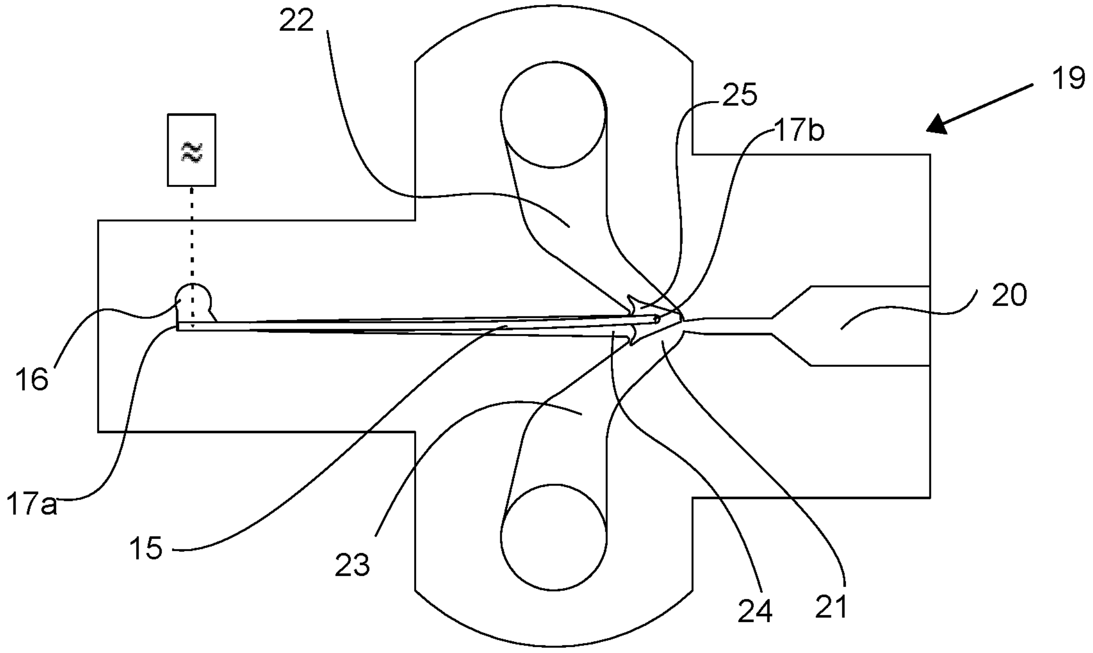
FIG. 6 shows a cross-section in an analogous view as FIG. 2, of a third embodiment of the first component, in a first state of use.
Figure 7:
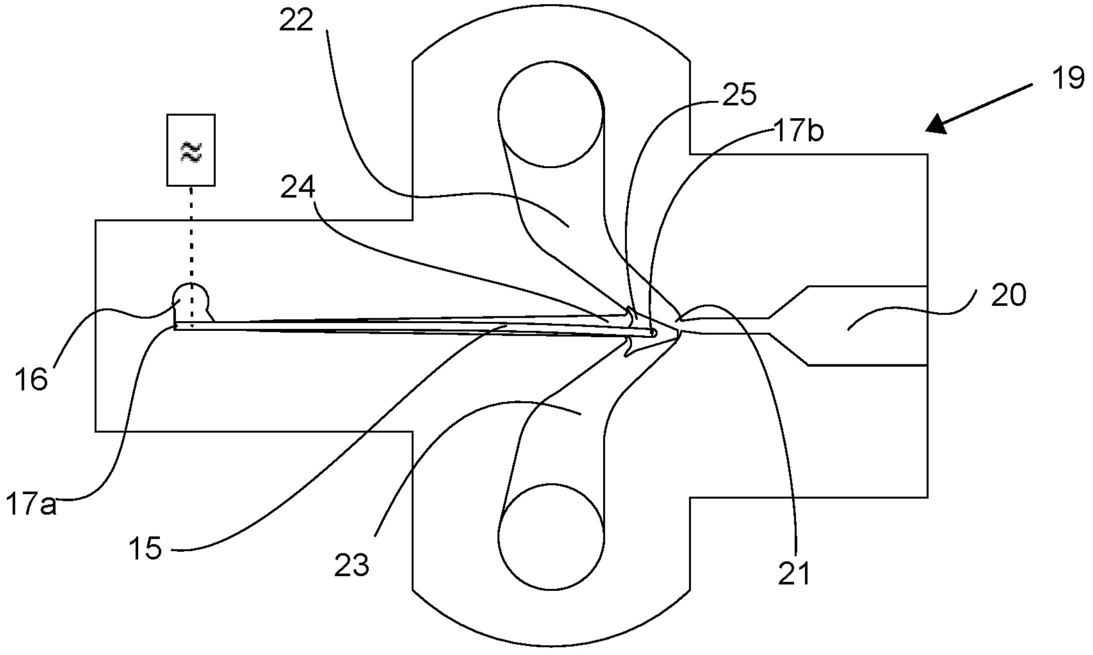
FIG. 7 shows the component of FIG. 6, in a second state of use.

Different to the first oscillator 1*a*, the third oscillator 1*c* comprises a pressure wave generator 19, shown in FIGS. 6 and 7, for generating a control signal. This pressure wave generator 19 comprises a second air inlet 20, which splits at a junction 21 into a first control channel 22 and a second control channel 23.

On the opposite side of the junction 21, compared to the second air inlet 20, a cavity 24 is present. In this cavity 24 a single piezo-electric bender actuator 15 is fixedly attached at one of its extremes 17*a*. The other, free, extreme 17*b* of the actuator 15 extends into the junction 21, and is provided with an approximately triangular valve member 25.

The first control channel 22 is connected to the first control port 11 and the second control channel 23 is connected to the second control port 12 of the bistable fluidic amplifier.

The actuator 15 is connected to a source of alternating voltage with a controllable frequency, via electrical wires which are not shown in the figures, but which run via a wire channel 16 provided in the housing of the pressure wave generator 19.

The actuator 15 can bend in two directions, depending on whether a positive or a negative voltage is applied to it, and can thereby adopt two working positions, one of which is shown in FIG. 6, and the other of which is shown in FIG. 7. It will be clear that in case no voltage is applied, the actuator 15 adopts a neutral position, intermediate between these two working positions.

The third oscillator 1*c* works as follows:

Like for the first oscillator 1*a*, a constant airflow is established at the first air inlet 5 and through the air inlet channel 6. This airflow through the air inlet channel 6 then establishes itself, like in the first oscillator 1*a*, in a stable flow pattern into either the first outlet channel 7 or the second outlet channel 8 due to the Coanda-effect, and then onward towards the corresponding air outlet 2,3.

A constant airflow is also established at the second air inlet 20, which is the air inlet of the pressure wave generator 9. This constant airflow is much smaller than the airflow through the air inlet channel 6 and is less than 10% of the airflow through the air inlet channel 6. This second airflow will be used to generate two control pressure wave signals which are fed to the control ports 11, 12.

In order to obtain this, an alternating voltage is applied to the actuator 15.

This actuator 15 will then alternatingly switch between the two working positions. A movement of the actuator 15 in one direction, e.g. from the working position shown in FIG. 6 to the working position shown in FIG. 7, will cause the second control channel 23 to become blocked at the junction 21, so that the airflow from the second air inlet 20 will exclusively flow into the first control channel 22 and thereby cause a pressure signal in the first control channel 22.

A movement of the actuators 15 the opposite direction, so from the working position shown in FIG. 7 to the working position shown in FIG. 6, will cause the first control channel 22 to become blocked at the junction 21, so that the airflow from the second air inlet 20 will exclusively flow into the second control channel 23 and thereby cause a pressure signal in the second control channel 23.

It is noted that the control channels 22, 23 do not necessarily need to become totally blocked. Partial blocking of the control channels 22, 23, so that the majority, preferably at least 67%, of the air will flow into the other control channel 22,23, is sufficient, although not optimal.

A repeated movement of the actuator 15 thereby generates two pressure wave control signals, one in the first control channel 22 and one in the second control channel 23, whereby these pressure waves are phase-shifted by half a wave period.

Because the first control channel 22 is connected to the first control port 11 and the second control channel 23 is connected to the second control port 12, a pressure signal in the first control channel 22 causes the airflow in the air inlet channel 6 to flow into the second outlet channel 8 and so towards the second air outlet 3. Likewise, a pressure signal in the second control channel 23 causes the airflow in the first air inlet 5 channel to flow into first outlet channel 7 and so towards the first air outlet 2.

This means that the control waves of pressure signals in the control channels 22, 23 are amplified by the fluidic amplifier in the third oscillator 1*c*, every time switching the airflow from the first outlet channel 7 to the second outlet channel 8 and back, thereby generating two pulsating airflows, one in each of the outlet channels 7, 8, each pulsating with the same oscillation frequency and phase-shifted by half a wave period.

It will be clear that the oscillation frequency of the third oscillator 1*c* will be the same as the frequency of the alternating voltage. This oscillation frequency can therefore be easily controlled by electronically altering the frequency of the alternating voltage. This can be done independently of the actual airflow through the third oscillator 1*c*.

An advantageous way of using the first, second and third oscillators is in a method of generating a bubble screen to reduce the propagation of underwater sound by attenuating the sound energy of this sound, which is desirable to limit the effects of construction works on animals in the water.

Figure 8:
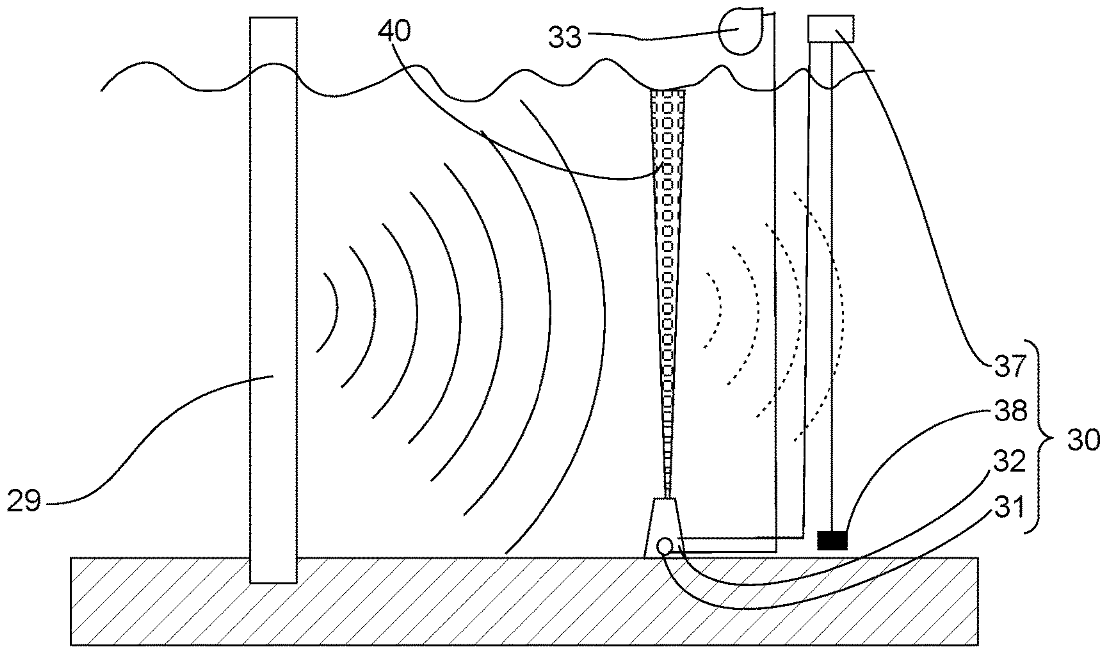
FIG. 8 shows a schematic view of a device according to the invention, in a side view in an operational state.
Figure 9:
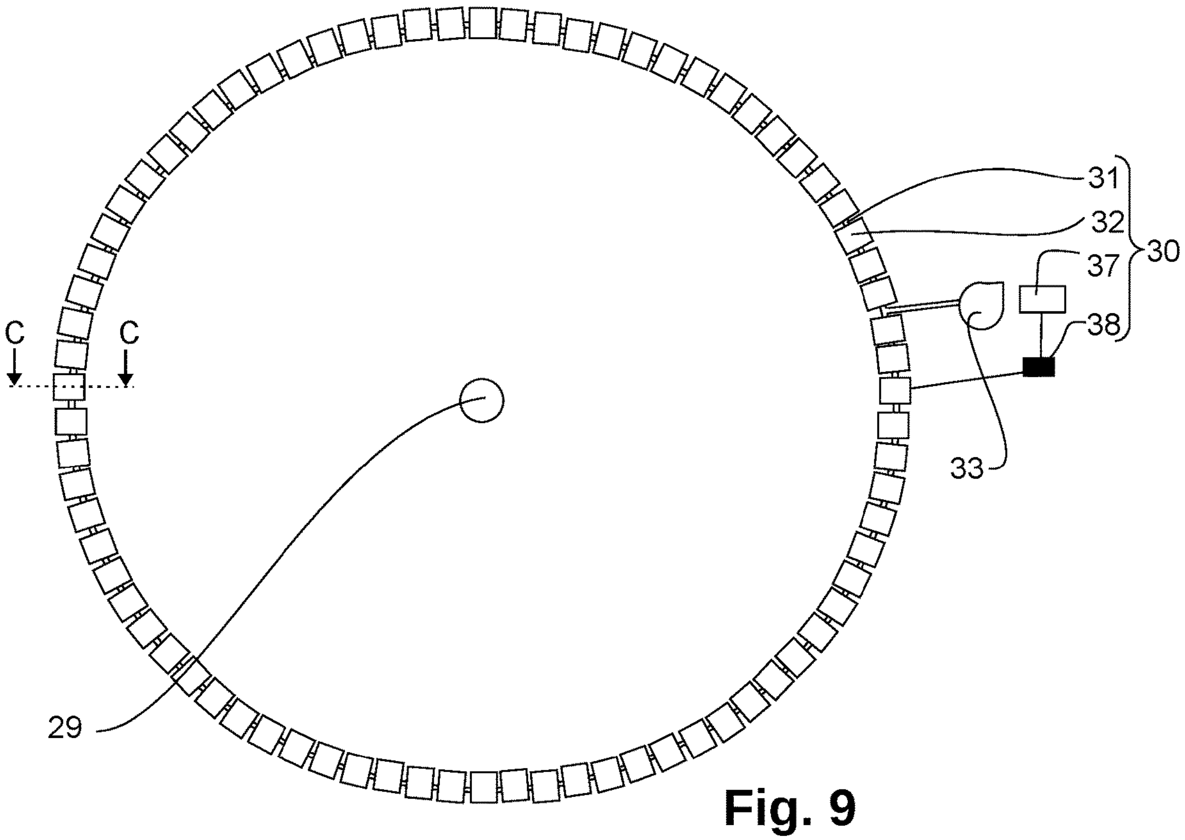
FIG. 9 shows a schematic top view of the device of FIG. 8.

This will be described below for the second oscillator 1*b*, referring to FIGS. 8 to 10. Note that a third oscillator 1*c* can also be used instead of the second oscillator 1*b* without adaptations. Note that a first oscillator 1*a* can also be used with some limitations, as will be described below. Note that FIGS. 8 and 9 are schematic representations and are not to scale.

In these figures a device 30 is shown for attenuation of sound energy, in other words for reducing underwater sound propagation, originating from a source 29 of underwater sound, e.g. offshore/inland water construction activities, such as pile driving for building constructions or platforms.

The device 30 comprises a flexible air hose 31, to which bubble generation units 32 are connected. The air hose 31 is connected to a source 33 of pressurized air.

The bubble generation units 32 are arranged in a circle with a radius of circa 50 m around a source 29 of underwater sound, for instance a pile-driving activity.

The bubble generation units 32 have a footprint of circa 50 cm by 100 cm, and contain two parallel rows 34*a*, 34*b*, on either side of the air hose 31, of eight identical oscillators 1*b* per row 34*a*, 34*b*.

Figure 10:
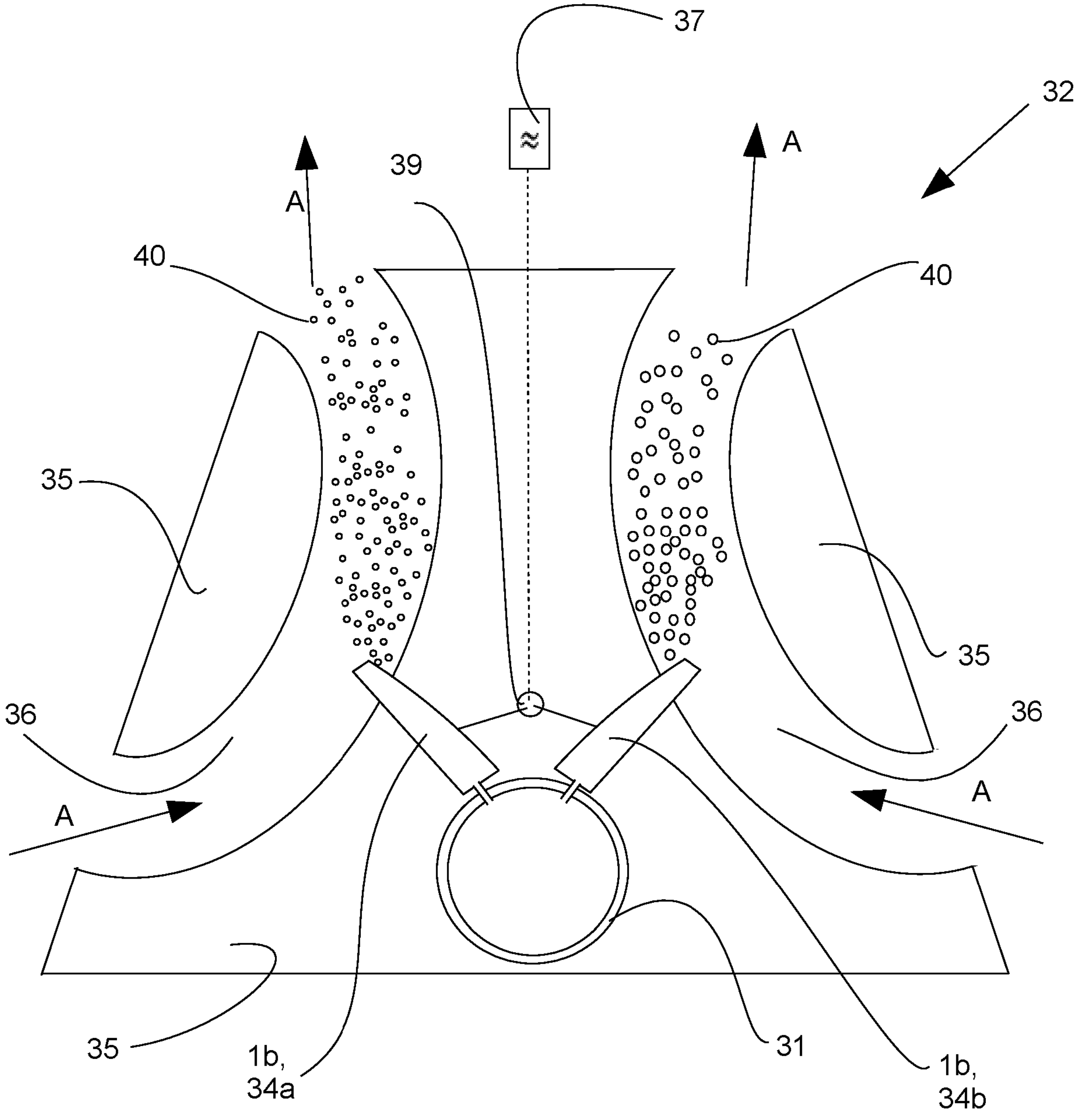
FIG. 10 shows a cross-section according to line C-C of a second component of the device of FIGS. 8 and 9.

A cross-section of the bubble generation units 32 is shown in FIG. 10. As can be seen, each of the bubble generation units 32 comprises a bubble generation unit body 35, typically made of rubber, in which for each oscillator a channel 36, running from close to the base of the bubble generation unit body 35 to the top of the bubble generation unit body 35, is provided.

Inside the bubble generation unit body 35, two rows 34*a*, 34*b* of second oscillators 1*b* are provided. These oscillators 1*b* are indicated schematically in FIG. 10. The first air inlet 5, and second air inlet 20 if present, of these oscillators 1*b* are connected to the air hose 31, whereby the air outlets 2,3 of the oscillators 1*b* debouch in said channel 36.

The device further comprises a control unit 37. The control unit 37 will usually be mounted on a ship, which is not shown in the figures. The control unit 37 is connected to the piezo-electric actuators 15 of the oscillators and is arranged to supply an alternating voltage to these actuators 15, via a cable channel 38.

The device 30 is set up such that separate connections for applying an alternating voltage from the control unit 37 to the separate rows of oscillators are present, so that an alternating voltage with a different frequency can be supplied to the piezo-electric actuators 15 of the oscillators in the respective rows.

The device 30 further comprises a hydrophone 39 which is connected to the control unit 37 and which is positioned outside the circle formed by the air hose 31. The control unit 37 is programmed to analyse a sound frequency spectrum captured by the hydrophone 39 and to determine the dominant frequency or frequencies in this sound frequency spectrum.

The use of the device 30 in a method for attenuating sound energy or reducing sound propagation under water is as follows.

When the source 29 of underwater sound, e.g. a pile driving activity, is active, pressurized air is supplied to the air hose 31 and an alternating voltage with a certain starting frequency is supplied by the control unit 37 to the oscillators 1*b*.

As a results the oscillators 1*b* will oscillate at that same frequency, and generate air pulses at the air outlets 2,3. At their air outlets 2,3, in this case provided with perforated plates 4, air bubbles 40 are thereby generated in the channels 36. The air bubbles 40 will start to move up, acting as an air pump and establishing an upward water flow in the channels 36, as indicated by the arrows A in FIG. 10. This water flow will effectively remove newly forming air bubbles 40 at the holes in the perforated plates 4, so that an equilibrium situation with a constant air bubble 40 size is quickly established. These air bubbles 40 are released from the channels 36 in the bubble generation unit body 35, so that these channels 36 in effect become a bubble outlet channel 36.

Due to the fact that many bubble generation units 32 are present, a circular air bubble screen is thereby formed. This bubble screen is effective in reflecting and absorbing sound, so that the long range effect of sound coming from the source 29 of underwater sound is limited.

At the same time, the hydrophone 39 captures the sound spectrum of the underwater sound outside the circle, so the sound spectrum of the underwater sound not absorbed or reflected by the air bubbles 40 in the bubble screen. This sound spectrum which is analysed by the control unit 37 by means of fast fourier transform so that the sound frequency or frequencies having the highest sound pressure can be established.

Accordingly, the control unit 37 can actively adapt the frequency of the alternating voltage supplied to the oscillators 1*b*, and thereby the oscillation frequencies of the oscillators 1*b*, and thereby the size of the air bubbles 40 generated, in order to achieve a maximum reduction of the propagation of the underwater sound.

It is particularly advantageous that two rows 34*a*, 34*b* of separately controllable oscillators 1*b* are provided in the same bubble generation units 32, so that two dominant frequencies or frequency ranges can be efficiently absorbed and reflected.

Hereby, a higher oscillation frequency will lead to smaller air bubbles 40, whereby smaller air bubbles 40 are effective in absorbing and reflecting sound of a higher frequency, compared to larger air bubbles 40.

Note that also a first oscillator 1*a* is usable in the bubble generation units 32. The air bubble size will then not be controllable and adjustable, but the advantage of obtaining a constant and stable flow of air bubbles 40 of a constant size out of such a bubble generation unit 32 is nevertheless present, compared to air bubbles created by random phenomena, such as occur when air is pressed out of a standard hole or nozzle, which will vary in size and in mutual distance.

A bubble generation unit 32 having a first oscillator 1*a* can firstly be better designed than traditional bubble generation units to generate air bubble sizes matching the sound frequency spectrum expected from specific underwater noise-generating activities. Secondly, such air bubbles 40 will coalesce less compared to air bubbles coming out of traditional bubble generation units, so that they remain active and effective longer, in other words over a greater vertical distance as they rise through the water.

Clearly, two, or even more, of such devices 30 can be used together, either or not supplied with pressurized air from the same source 33.

In such a case, a second device 30 is placed in a circle around a first device 30.

As a consequence, two concentric bubble screens are formed.

Since the sound frequency spectra of a first sound, generated by the source 29 of underwater sound, and a second sound on the outside of the inner bubble screen, which sound results from partial absorption and reflection of the first sound, will usually have different frequencies which have the highest sound pressure, the oscillators 1*b* in the bubble generation units 32 of the second device 30 will usually work at a different oscillation frequency than the oscillators 1*b* in the bubble generation units 32 of the first device 30, thereby generating different bubble sizes in the inner bubble screen than in the outer bubble screen.

It is noted that both devices 30 comprise a separate hydrophone located on the other side of the respective bubble screen compared to the source of underwater sound, so that the performance of both devices 30 can be optimized independently for greater overall performance.

Another useful application of the first, second and third oscillators 1*a*,1*b*,1*c* is the generation of gas or liquid bubbles of an optimal and constant size in the chemical industry, either for optimising physical phenomena, such as gas-liquid or liquid-liquid material transfer, e.g. by diffusion, or chemical phenomena, such as gas-liquid or liquid-liquid chemical reactions.

The invention claimed is:

1. A device attenuating underwater sound pressure, comprising:

at least one bubble generator; and an air conduit configured for supplying pressurized air to the bubble generation unit, wherein the at least one bubble generator comprises a fluidic oscillator for generating one or more pulsating air flows from a constant air flow, wherein the fluidic oscillator is a fluidic oscillator with an adjustable oscillation frequency, wherein the oscillation frequency of the fluidic oscillator is adjustable independently of the air pressure in the air conduit, and wherein the device comprises a hydrophone and a controller, the controller being arranged to receive an input signal from the hydrophone and to send to the fluidic oscillator a control signal for controlling the oscillation frequency, wherein the controller is arranged to calculate the control signal using the input signal.

2. The device according to claim 1, wherein the controller is arranged to calculate a sound frequency distribution from the input signal, and wherein the controller is arranged to calculate the control signal from the sound frequency distribution.

3. The device according to claim 1, wherein the device comprises a first type of said fluidic oscillator and a second type of said fluidic oscillator, and wherein the first type of said fluidic oscillator and the second type of said fluidic oscillator are designed to operate at different oscillation frequencies if they are supplied with air at the same pressure.

4. The device according to claim 1, wherein the air conduit is a flexible air hose, and wherein the device comprises a plurality of said at least one bubble generator arranged along at least a part of a length of the air hose.

5. The device according to claim 1, wherein the at least one bubble generator comprises a bubble generation unit body having a bubble outlet channel open at a top end and a bottom end thereof, and wherein the fluidic oscillator comprises an air outlet which debouches in the bubble outlet channel.

6. The device according to claim 1, wherein the fluidic oscillator comprises at least two separate air outlets operating at the same frequency but phase-shifted by half a wave period.

7. A method of using the device according to claim 1 for attenuating the sound energy of underwater sound, comprising the steps of:

placing the air conduit and the at least one bubble generation unit underwater;

supplying pressurized air to the air conduit; and generating air bubbles by the at least one bubble generation unit.

8. The method of using according to claim 7, wherein there is one or more of said device, wherein the air conduit or air conduits of the one or more of said device encircle a source of underwater sound, and wherein the one or more of said device comprises at least four bubble generators placed underwater.

9. The method of using according to claim 7, wherein the hydrophone is placed underwater, and wherein the air conduit is placed between the hydrophone and a source of underwater sound.

10. The method of using according to claim 9, wherein the controller controls the oscillation frequency of the fluidic oscillator depending on the frequency distribution of the sound captured by the hydrophone.

11. The method of using according to claim 7, wherein the device comprises at least two fluidic oscillators, each of the at least two fluidic oscillators having an adjustable oscillation frequency, wherein the at least two fluidic oscillators are supplied with air from the same air conduit, wherein a first fluidic oscillator of said at least two fluidic oscillators is controlled to operate at a first oscillation frequency, and wherein a second fluidic oscillator of said at least two fluidic oscillators is controlled to operate at a second oscillation frequency.

12. The method of using according to claim 7, wherein said device is a first device and a second device, wherein the air conduit of the first device forms at least part of an encirclement of a source of underwater sound, and wherein the air conduit of the second device forms at least part of an encirclement of the air conduit of the first device.

13. The method of using according to claim 12, wherein the bubble generator of the first device generates bubbles of a different size than the bubble generator of the second device.

* * * * *